US011409552B2

(12) United States Patent
Medina et al.

(10) Patent No.: US 11,409,552 B2
(45) Date of Patent: Aug. 9, 2022

(54) HARDWARE EXPANSION PREDICTION FOR A HYPERCONVERGED SYSTEM

(71) Applicant: International Business Machines Corporation, Armonk, NY (US)

(72) Inventors: Cynthia Diaz Medina, Los Angeles, CA (US); Debbani Kundu Naskar, Milpitas, CA (US); Sneha Arunkumar Gaikwad, San Jose, CA (US); Shalini Gundaiah Ramamurthy, Fremont, CA (US); Sahil Bhadreshkumar Shah, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 254 days.

(21) Appl. No.: 16/580,912

(22) Filed: Sep. 24, 2019

(65) Prior Publication Data

US 2021/0089341 A1    Mar. 25, 2021

(51) Int. Cl.
  *G06F 9/455*   (2018.01)
  *G06F 9/50*    (2006.01)
  *G06F 11/30*   (2006.01)
  *G06F 8/61*    (2018.01)

(52) U.S. Cl.
  CPC ........... *G06F 9/45558* (2013.01); *G06F 8/61* (2013.01); *G06F 9/5016* (2013.01); *G06F 9/5044* (2013.01); *G06F 11/3024* (2013.01); *G06F 11/3034* (2013.01); *G06F 11/3037* (2013.01); *G06F 2009/45591* (2013.01)

(58) Field of Classification Search
  None
  See application file for complete search history.

(56) References Cited

U.S. PATENT DOCUMENTS

| | | | |
|---|---|---|---|
| 10,248,400 B1 | 4/2019 | Coleman | |
| 10,489,215 B1* | 11/2019 | Wen | H04L 41/0896 |
| 10,594,562 B1* | 3/2020 | Rastogi | H04L 41/0896 |
| 10,635,437 B1* | 4/2020 | Kunjuramanpillai | G06F 8/433 |
| 10,667,431 B1* | 5/2020 | Lunsman | H05K 7/2039 |
| 2002/0016954 A1* | 2/2002 | Charisius | G06F 9/44 717/106 |
| 2014/0047119 A1* | 2/2014 | Wong | G06F 9/5027 709/226 |

(Continued)

FOREIGN PATENT DOCUMENTS

CN    107729219 A    2/2018

*Primary Examiner* — Wynuel S Aquino
(74) *Attorney, Agent, or Firm* — Yee & Associates, P.C.

(57) ABSTRACT

A method, apparatus, system, and computer program product to managing a hyperconverged system. Hardware resource usage in a hyperconverged system is monitored. A set of supported applications for the hyperconverged system that have been purchased but are undeployed is identified. A determination is made as to whether a number of additional hardware nodes is needed to deploy and utilize the set of supported applications for the hyperconverged system that have been purchased but are undeployed. A set of actions is initiated in response to a determination that the number of additional hardware nodes is needed to deploy and utilize the set of supported applications for the hyperconverged system that have been purchased but are undeployed.

14 Claims, 6 Drawing Sheets

(56) References Cited

U.S. PATENT DOCUMENTS

| | | | |
|---|---|---|---|
| 2014/0359469 A1* | 12/2014 | Alphin, III | G06F 8/63 |
| | | | 715/745 |
| 2015/0312104 A1 | 10/2015 | Riewrangboonya et al. | |
| 2016/0299750 A1* | 10/2016 | Koniges | G06F 8/61 |
| 2017/0357533 A1 | 12/2017 | Chaganti et al. | |
| 2018/0285166 A1* | 10/2018 | Roy | G06F 11/34 |
| 2019/0146847 A1* | 5/2019 | Gibson | G06F 9/5044 |
| | | | 718/104 |

* cited by examiner

HARDWARE EXPANSION PREDICTION FOR A HYPERCONVERGED SYSTEM

BACKGROUND

1. Field

The disclosure relates generally to an improved computer system and, more specifically, to a method, apparatus, system, and computer program product for managing a hyperconverged system.

2. Description of the Related Art

A hyperconverged infrastructure (HCI) is a software defined information technology infrastructure that virtualizes all of the elements of conventional hardware defined systems. A hyperconverged system using this architecture can include processing resources, storage resources, and networking resources that are virtualized rather than using actual hardware. These resources are virtualized on hardware which are also referred to as hardware nodes. These resources can be managed using a hypervisor, which is also referred to as a virtual machine monitor (VMM).

A hyperconverged system allows a customer flexibility to start with computer, storage, and network resources that are currently needed. This type of infrastructure enables the customer to expand the hyperconverged system to meet increased resource needs.

SUMMARY

According to one embodiment of the present invention, a method manages a hyperconverged system. Hardware resource usage in a hyperconverged system is monitored. A set of supported applications for the hyperconverged system that have been purchased but are undeployed is identified. A determination is made as to whether a number of additional hardware nodes is needed to deploy and utilize the set of supported applications for the hyperconverged system that have been purchased but are undeployed. A set of actions is initiated in response to a determination that the number of additional hardware nodes is needed to deploy and utilize the set of supported applications for the hyperconverged system that have been purchased but are undeployed.

According to another embodiment of the present invention a hardware management system for a hyperconverged system comprises a computer system. The computer system is configured to monitor hardware resource usage in a hyperconverged system. The computer system is configured to identify a set of supported applications for the hyperconverged system that have been purchased but are undeployed. The computer system is configured to determine whether a number of additional hardware nodes is needed to deploy and utilize the set of supported applications for the hyperconverged system that have been purchased but are undeployed. The computer system is configured to initiate a set of actions in response to a determination that the number of additional hardware nodes is needed to deploy and utilize the set of supported applications for the hyperconverged system that have been purchased but are undeployed.

According to yet another embodiment of the present invention, a computer program product for managing a hyperconverged system comprises a computer-readable-storage media with first program code, second program code, third program code, and fourth program code stored on the computer-readable storage media. The first program code is executed to monitor hardware resource usage in a hyperconverged system. The second program code is executed to identify a set of supported applications for the hyperconverged system that have been purchased but are undeployed. The third program code is executed to determine whether a number of additional hardware nodes is needed to deploy and utilize the set of supported applications for the hyperconverged system that have been purchased but are undeployed. The fourth program code is executed to initiate a set of actions in response to a determination that the number of additional hardware nodes is needed to deploy and utilize the set of supported applications for the hyperconverged system that have been purchased but are undeployed.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account a number of different considerations. For example, the illustrative embodiments recognize and take into account that often times customers or other users of a hyperconverged system may not realize that increased resources are needed and that those increased resources require additional hardware such as additional hardware nodes. As a result, time such as weeks is often needed before the hardware can be purchased and implemented to increase the resources available in the hyperconverged system. Therefore, the illustrative embodiments recognize that it would be desirable to have a method, apparatus, system, and program product that take into account these issues as well as other issues.

Thus, in one illustrative example, a method, apparatus, system, and computer program product, or some combination thereof, manages a hyperconverged system. A computer system monitors hardware resource usage in a hyperconverged system. The computer system identifies a set of supported applications for the hyperconverged system that have been purchased but are undeployed. The computer system also determines whether a number of additional hardware nodes is needed to deploy and utilize the set of supported applications for the hyperconverged system that have been purchased but are undeployed; and initiates a set of actions in response to a determination that the number of additional hardware nodes is needed to deploy and utilize the set of supported applications for the hyperconverged system that have been purchased but are undeployed.

Figure 1:
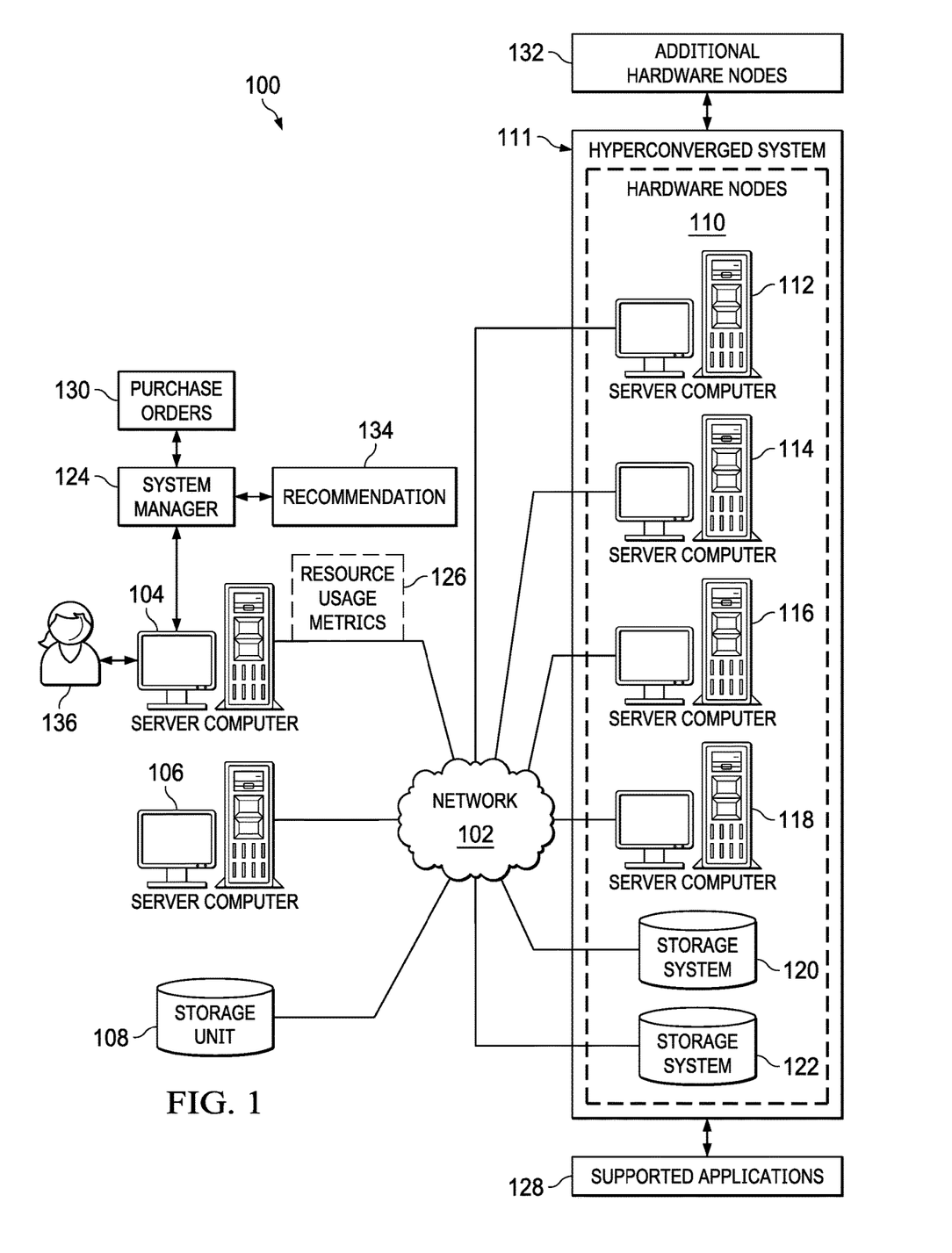
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, hardware nodes 110 in hyperconverged system 111 connect to network 102. In this example, hyperconverged system 111 comprises a virtualization of computing resources, storage resources, and networking resources on hardware nodes 110 in hyperconverged system 111.

As depicted, hardware nodes 110 include server computer 112, server computer 114, server computer 116, server computer 118, storage system 120, and storage system 122. Hardware nodes 110 can include other devices in addition to or in place of the ones depicted, such as computers, workstations, network computers, or other suitable computer devices for hardware nodes 110 that process data in hyperconverged system 111. Storage system 120 and storage system 122 can be implemented using solid state storage devices, storage units, storage arrays, storage networks, network attached storage (NAS), storage area network (SAN) storage, and other suitable hardware for storage systems for hardware nodes 110 in hyperconverged system 111.

In the depicted example, server computer 104 provides information such as boot files, operating system images, and applications to hardware nodes 110. In this illustrative example, server computer 104, server computer 106, storage unit 108, and hardware nodes 110 are network devices that connect to network 102 in which network 102 is the communications media for these network devices.

Network data processing system 100 may include additional server computers, client computers, and other devices not shown. Hardware nodes 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to hardware nodes 110 over network 102 for use on hardware nodes 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As depicted, system manager 124 manages virtualized elements of hardware found in hardware systems. For example, system manager 124 can monitor hardware resource use in hyperconverged system 111. In other words, system manager 124 can monitor the utilization of hardware nodes 110 in hyperconverged system 111. In the illustrative example, system manager 124 runs on server computer 104. Server computer 104 is a host machine, while virtual machines running on hardware nodes 110 are guest machines.

In this illustrative example, system manager 124 monitors hardware resource usage using resource usage metrics 126 collected from hardware nodes 110 in hyperconverged system 111. As depicted, system manager 124 identifies a set of supported applications 128 for hyperconverged system 111 that have been purchased but are undeployed by examining purchase orders 130. System manager 124 determines whether one or more of additional hardware nodes 132 are needed to deploy and utilize the set of supported applications 128 for hyperconverged system 111 that have been purchased but are undeployed. This determination can be a prediction of what additional hardware nodes 132 should be added to hyperconverged system 111 before supported applications 128 are deployed in hyperconverged system 111.

As used herein, a "set of," when used with reference to items, means one or more items. For example, "a set of supported applications 128" is one or more of support applications 128.

In this example, system manager 124 generates recommendation 134 and displays recommendation 134 to user 136 in response to a determination that one or more of additional hardware nodes 132 are needed to deploy and utilize the set of supported applications 128 that have not been undeployed. User 136 can be, for example, a system administrator, a network administrator, a purchasing agent, or some other person who can purchase or otherwise appropriate additional hardware nodes 132 for use in hyperconverged system 111 for use in deploying supported applications 128.

Thus, system manager 124 provides a hardware expansion prediction for hyperconverged system 111 in a manner that can streamline the process of determining when to add hardware to expand hyperconverged system 111 to support adding new applications to hyperconverged system 111.

Further, users can be alerted ahead of time with recommendations before hyperconverged system 111 runs out of resources. The recommendations provided by system manager 124 can be used to plan additions of hardware before system failures occur. As a result, the recommendations can allow for adding hardware at a time that avoids experience failures caused by maximizing resource usage in hyperconverged system 111.

Figure 2:
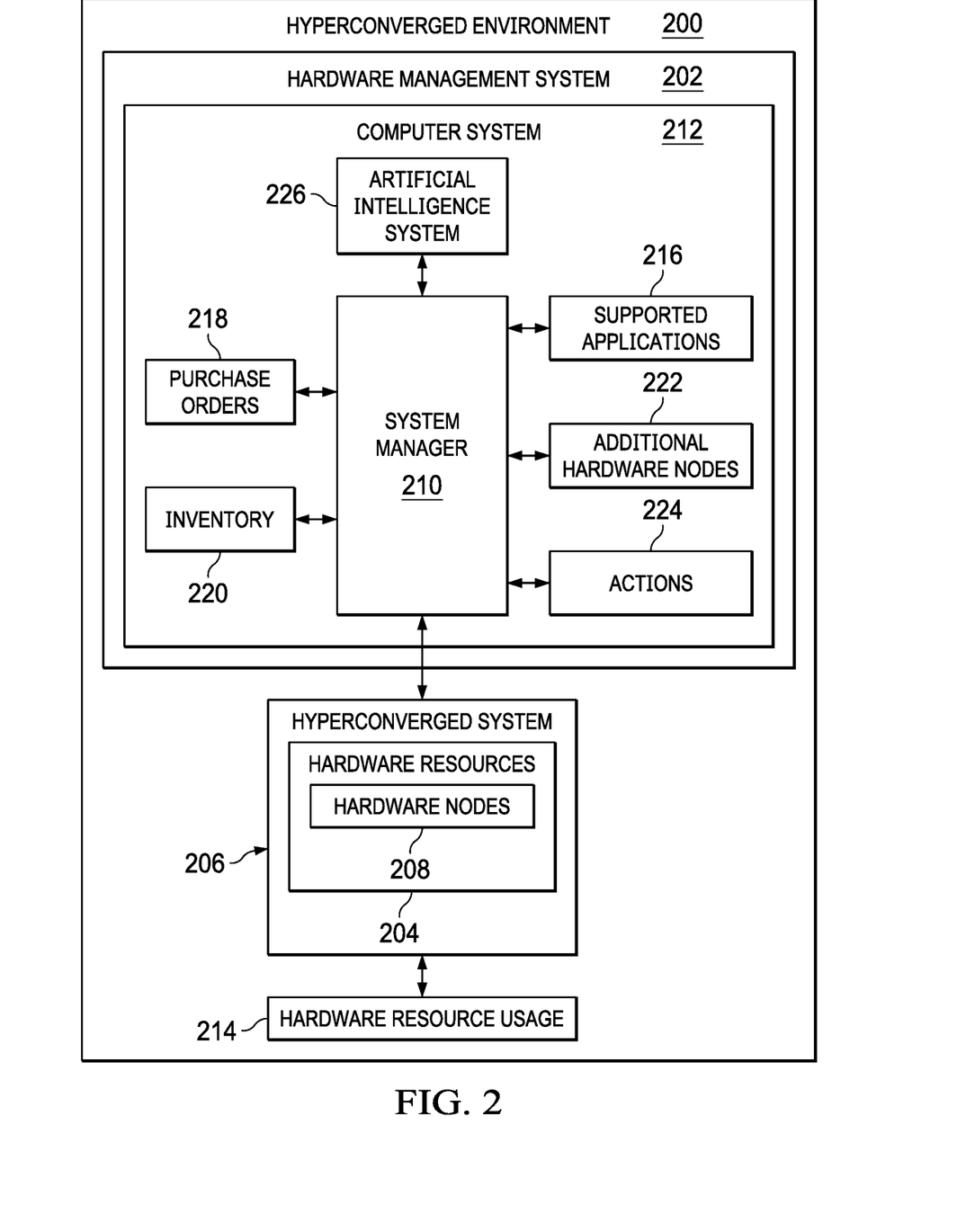
FIG. 2 is a block diagram of a hyperconverged environment in accordance with an illustrative embodiment.

With reference now to FIG. 2, a block diagram of a hyperconverged environment is depicted in accordance with an illustrative embodiment. In this illustrative example, hyperconverged environment 200 includes components that can be implemented in hardware such as the hardware shown in network data processing system 100 in FIG. 1.

In this illustrative example, hardware management system 202 can operate to manage hardware resources 204 in hyperconverged system 206. As depicted, hyperconverged system 206 provides a virtualization of hardware such as data processing resources, storage resources, networking resources, or other suitable resources. The virtualized resources operate on hardware such as hardware nodes 208 in hyperconverged system 206. In this example, hardware nodes 208 can include at least one of a computer, a server computer, a work station, a storage system, a solid state storage device, a storage unit, a storage array, a storage networks, network attached storage (NAS), storage area network (SAN) storage, or other suitable hardware.

In this example, hardware management system 202 comprises system manager 210 in computer system 212. System manager 210 can be implemented in software, hardware, firmware, or a combination thereof. When software is used, the operations performed by system manager 210 can be implemented in program code configured to run on hardware, such as a processor unit. When firmware is used, the operations performed by system manager 210 can be implemented in program code and data and stored in persistent memory to run on a processor unit. When hardware is employed, the hardware may include circuits that operate to perform the operations in system manager 210.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, a work station, or some other suitable data processing system.

In the illustrative embodiment, system manager 210 in computer system 212 is configured to monitor hardware resource usage 214 in hyperconverged system 206. Hardware resource usage 214 in hyperconverged system 206 can be usage of resources in hardware nodes 208 in hyperconverged system 206. Hardware resource usage 214 can include at least one of a storage usage, a processor usage, a memory usage, disk input/output, or some other type of hardware resource usage 214 in hyperconverged system 206.

As depicted, system manager 210 is configured to identify a set of supported applications 216 for hyperconverged system 206 that have been purchased but are undeployed. These supported applications are also referred to as undeployed supported applications. In the illustrative example, a supported application is a software application that is available to use in hyperconverged system 206. The application can be, for example, an application purchased for use in hyperconverged system 206, an application obtained from a user, an application received from a third party, or any other application that may be designated or selected for use in hyperconverged system 206. In some cases, minimum requirements for a supported application may be known before deployment. In other cases, the minimum requirements for the supported application may be unknown before deployment. In this case, the hardware usage by the application can be determined after the application has been deployed and runs on hyperconverged system 206.

The identification of supported applications 216 that have been purchased but are undeployed can be determined using a set of purchase orders 218 for supported applications 216. For example, the number of licenses for supported applications 216 can be determined from the set of purchase orders. Inventory 220 of supported applications 216 deployed in hyperconverged system 206 can be compared to the number of licenses to determine how many of supported applications 216 have not been deployed in hyperconverged system 206.

Further, system manager 210 is configured to determine whether a number of additional hardware nodes 222 is needed to deploy and utilize the set of supported applications 216 for hyperconverged system 206 that have been purchased but are undeployed. In this illustrative example, system manager 210 is configured to initiate a set of actions 224 in response to a determination that the number of additional hardware nodes 222 is needed to deploy and utilize the set of supported applications 216 for hyperconverged system 206 that have been purchased but are undeployed. The set of actions 224 can be at least one of sending a recommendation to add the number of hardware nodes 208, generating a purchase order for the number of hardware nodes 208, deploying a set of undeployed hardware nodes; or reallocating a set of deployed hardware nodes in another system as the set of additional hardware nodes 222, or other suitable actions.

In the illustrative example, one or more processes in system manager 210 can be performed using artificial intelligence system 226. Artificial intelligence system 226 is a system that has intelligent behavior and can be based on the function of a human brain. An artificial intelligence system comprises at least one of an artificial neural network, a cognitive system, a Bayesian network, a fuzzy logic, an expert system, a natural language system, or some other suitable system. Machine learning is used to train the artificial intelligence system. Machine learning involves inputting data to the process and allowing the process to adjust and improve the function of the artificial intelligence system. A cognitive system is a computing system that mimics the function of the human brain.

Figure 3:
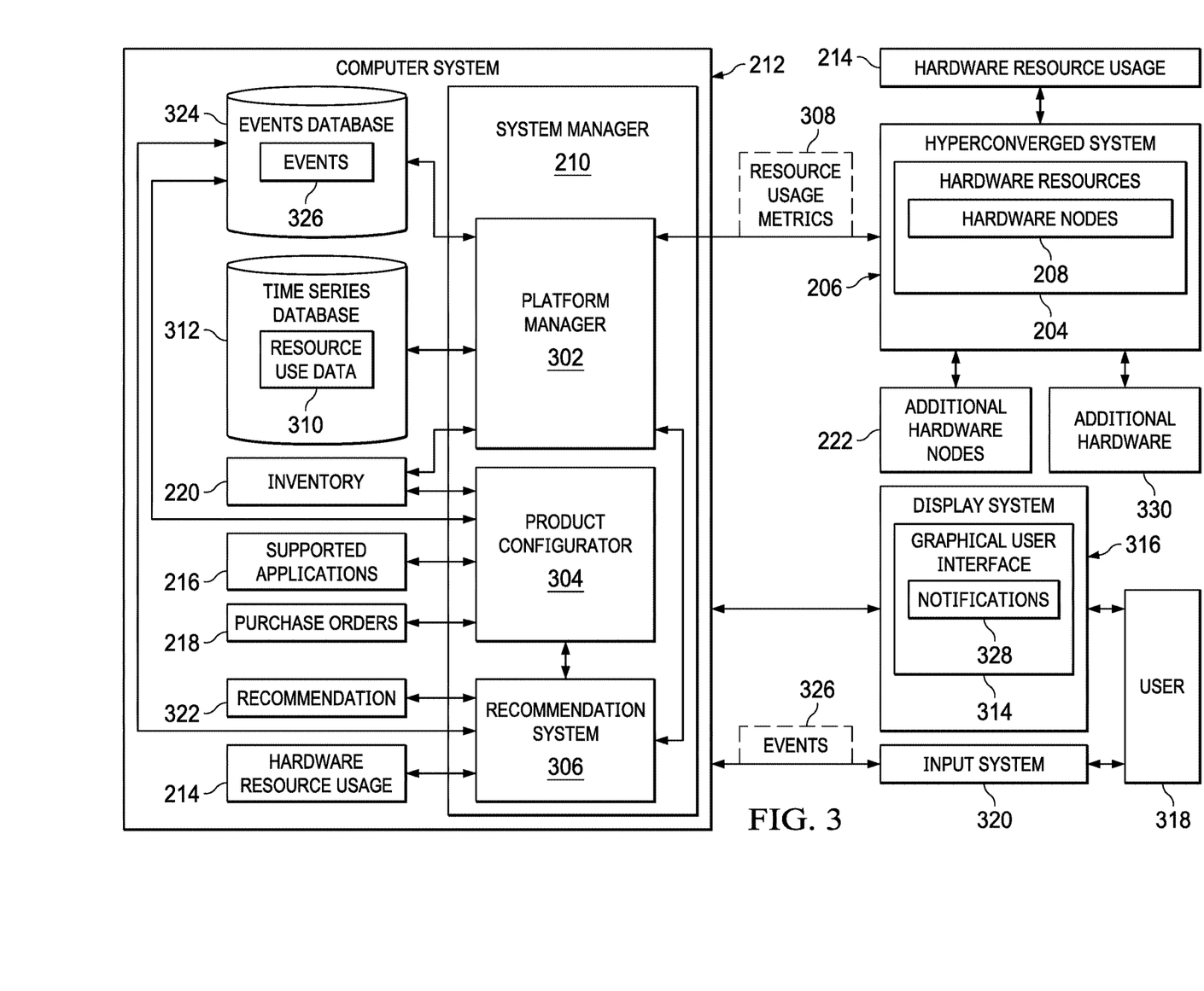
FIG. 3 is an illustration of components in a system manager in accordance with an illustrative embodiment.

With reference next to FIG. 3, an illustration of components in a system manager is depicted in accordance with an illustrative embodiment. In this figure, an example of components that can be used in system manager 210 in FIG. 2 is depicted.

In this example, system manager 210 comprises platform manager 302, product configurator 304, and recommendation system 306. These components for system manager 300 are implemented using software in this depicted example. In other illustrative examples, one or more of these components can be implemented using hardware or a combination of software and hardware.

As depicted in this illustrative example, platform manager 302 operates to manage the configuration and operation of hardware resources 204 in hyperconverged system 206. Monitoring hardware resource usage 214 is performed by platform manager 302 in this illustrative example.

As depicted, platform manager 302 collects resource usage metrics 308 from hyperconverged system 206 for use in monitoring hyperconverged system 206. In this illustrative example, resource usage metrics 308 include the usage of hardware resources 204 selected from at least one of storage, processor, memory, disk input/output, and other metrics. These metrics can be collected for each hardware node in hardware nodes 208 in hyperconverged system 206. In this illustrative example, resource usage metrics 308 can be collected from at least one of hardware or software in hyperconverged system 206.

In this illustrative example, resource usage metrics 308 can be collected on a periodic basis to obtain data needed for predicting a need for hardware expansions and recommended corporate expansions. A scheduled job can be used to periodically collect resource usage metrics 308 and store these metrics as part of resource use data 310 in time series database 312. In this illustrative example, time series database 312 is designed specifically for handling metrics and events or measurements that are time-stamped. Resource use data 310 comprises resource usage metrics 308 collected over a period of time.

With resource use data 310 stored in time series database 312, identification of hardware resource usage 214 in hyperconverged system 206 can be identified for different periods of time in addition to real-time usage. This historical data can provide insight into how many of which hardware resources are typically used and detect trends such as when hardware resource usage 214 tends to spike or if hardware resource usage 214 is gradually increasing. Such information can be used to determine whether hyperconverged system 206 requires additional hardware components, such as a set of additional hardware nodes 222, such that hyperconverged system 206 can continue to provide computing services for user needs.

In this illustrative example, platform manager 302 can display graphical user interface 314 on display system 316 to user 318 to enable user 318 to monitor the current state of hyperconverged system 206 at different levels. These different levels can include an overview as well as specific details on hardware components in hyperconverged system 206.

Display system 316 is a physical hardware system and includes one or more display devices on which graphical user interface 314 can be displayed. The display devices can include at least one of a light emitting diode (LED) display, a liquid crystal display (LCD), an organic light emitting diode (OLED) display, a computer monitor, a projector, a flat panel display, a heads-up display (HUD), or some other suitable device that can output information for the visual presentation of information. User 318 can interact with graphical user interface 314 through user input generated by input system 320, which is a physical hardware system. Input system 320 can be selected from at least one of a mouse, a keyboard, a trackball, a touchscreen, a stylus, a motion sensing input device, a cyber glove, or some other suitable type of input device. Display system 316 and input system 320 form a human machine interface (HMI).

In this illustrative example, product configurator 304 can access purchase orders 218 and inventory 220 to identify which ones of supported applications 216 have been purchased for hyperconverged system 206 but have not yet been deployed. In this illustrative example, inventory 220 is an inventory of hardware resources 204 generated by platform manager 302. This information can be used to can help determine if more hardware resources 204 are needed to deploy and utilize these identified applications. Further, inventory 220 can also include software resources. For example, the identification of software resources can be used to determine what supported applications have been deployed in hyperconverged system 206.

Further, product configurator 304 can identify minimum resource requirements for supported applications 216 to aid recommendation system 306 in making decisions as to whether additional hardware resources are needed for hyperconverged system 206. If the already-installed applications in supported applications 216 consume hardware resources 204 such that sufficient amounts of hardware resources 204 are not available to install additional applications in supported applications 216, recommendation system 306 can generate recommendation 322 that one or more additional hardware nodes 222 should be added to hyperconverged system 206 to provide resources needed for installing and using one or more applications in supported applications 216 that have not yet been installed. As depicted, recommendation system 306 can obtain information about supported applications 216 from product configurator 304 for use in identifying minimum requirements. The identification of minimum requirements can determine as to whether or how many additional hardware nodes 222 may be needed to support adding supported applications to hyperconverged system 206.

In the illustrative example, recommendation system 306 can obtain pricing details for the recommended expansions and make that information available for use in deciding whether to add additional hardware nodes 222 to hyperconverged system 206. In this example, this information can be made available in recommendation 322 displayed on graphical user interface 314.

In addition to recommending when to purchase additional hardware nodes 222, the system can use inventory 220 of current hardware components in hyperconverged system 206 to determine what other hardware components may need to be purchased to support a recommended hardware node expansion. For example, adding a set of additional hardware nodes 222 may require also adding additional hardware 330 in the form of more switches. This hardware can also be included as part of recommendation 322 with recommendation 322 adding additional hardware nodes 222.

In this illustrative example, events database 324 is an optional component that can be used by recommendation system 306. In this illustrative example, events database 324 can receive and store events 326 received from input system 320. In this illustrative example, events database 324 comprises a collection of data and includes software to interact with other components such as system manager 210 and input system 320. This interaction can include storing data and returning data responsive to queries made to events database 324.

As depicted, events database 324 stores events 326 in real-time which can further aid recommendation system 306 to make predictions for notifications 328 displayed on graphical user interface 314.

As depicted, events database 324 stores at least one of actions or feedback by user 318 from notifications 328 as events 326. In this illustrative example, events 326 can be used by recommendation system 306 to aid in validating recommendation 322 and in readjusting recommendation 322 if necessary. For example, whether user 318 performed actions that met the prior recommendations or actions, the modified prior recommendations can be used to determine whether recommendation 322 should be adjusted.

Thus, events database 324 can serve as a feedback loop for the recommendations generated by recommendation system 306 and the actions taken by users on those recommendations. Further, events 326 can be used to retrain recommendation system 306 to generate more accurate recommendations when recommendation system 306 uses or includes artificial intelligence system 226. Additionally, events database 324 can be used to provide a more personalized experience to user 318. For example, user 318 can ask to be reminded of certain recommendations generated by recommendation system 306 at a later date or choose to not be alerted again with respect to a particular recommendation.

Further, recommendation system 306 can use events database 324 to generate alerts for recommendations based on user set specific thresholds for the different metrics being tracked. In this illustrative example, recommendation system 306 can obtain resource use data 310 stored in time series database 312 from platform manager 302 for comparison to thresholds to determine whether an alert for recommendations should be met.

In this illustrative example, recommendation system 306 can recognize when hardware resource usage 214 may have reached capacity for hyperconverged system 206. However, users may have their own preferences for when the infrastructure for a hyperconverged system should be expanded. For example, if user 318 expects hyperconverged system 206 to run at a certain capacity such as 80% storage for a longer duration, the user may not want to be alerted at 80%. Thresholds can help in these cases where the user can decide at which point resource usage should be considered to have reached a limit that requires taking action.

In one illustrative example, recommendation system 306 can use heuristics as a bootstrap mechanism to generate recommendations. When resource use data 310 increases in time series database 312, recommendation system 306 can incorporate a machine learning model in artificial intelligence system 236 to improve recommendations made by recommendation system 306 based on patterns recognized about different hyperconverged systems. These recommendations, made by artificial intelligence system 236, can embody predictions of when additional hardware nodes 222 may be needed. For example, additional hardware nodes 222 may not be needed to install and run additional supported applications 216 initially but based on trends in hardware resource usage 214, artificial intelligence system 236 may determine that additional hardware nodes 222 will be needed a few days or weeks after installing additional supported applications 216. The recommendation can include a prediction of when additional hardware nodes 222 will be needed after installing additional supported applications 216 and recommend when to add additional hardware nodes 222.

In one illustrative example, the machine learning model in artificial intelligence system 226 retrieves resource usage metrics collected for resource use data 310 in time series database 312 to detect any patterns in hardware resource usage 214 over long periods of time and to detect when workloads on hyperconverged system 206 require additional hardware nodes 222 and other hardware resources. For example, if a specific time occurs throughout the day when hyperconverged system 206 is used more heavily and negatively affects performance of different workloads, then recommendation system 306 will recommend procuring a set of additional hardware nodes 222 in the form of computing hardware nodes to improve performance and increase efficiency. If storage usage is gradually growing, recommendation system 306 will recommend a set of additional hardware nodes 222 in the form of additional storage nodes. The machine learning model can also take into account current resource usage and minimum resource requirements for any purchased applications pending deployment to aid in making these recommendations about future hardware resource usage that may require hardware expansions on hyperconverged system 206.

With hardware management system 202 as depicted and described with respect to FIG. 2 and FIG. 3, determining when to expand a hyperconverged system can be streamlined and made more efficient. For example, users will be alerted ahead of time with recommendations for adding additional hardware nodes before hardware resource usage exceeds the ability of a hyperconverged system to process workloads efficiently. With the use of hardware management system 202, the overhead incurred with stopping work and recovering the health of a hyperconverged system when the hyperconverged system experiences failures caused by maximizing resource usage is reduced. Further, users can reduce time or avoid having to wait for hardware for an expansion of a hyperconverged system when receiving recommendations to add hardware such as additional hardware nodes. In the illustrative example, the recommendations generated by hardware management system 202 provide an ability to plan and order hardware ahead of time based on the recommendations that have been made. In this manner, the additional hardware can be installed and ready for use once the additional resources in the hyperconverged system are needed or desired.

Computer system 212 can be configured to perform at least one of the steps, operations, or actions described in the different illustrative examples using software, hardware, firmware, or a combination thereof. As a result, computer system 212 operates as a special purpose computer system in which system manager 210 in computer system 212 operates to provide time to add hardware resources 204, such as additional hardware nodes 222, before hyperconverged system 206 is unable to function as desired because of a lack of hardware resources 204.

In particular, system manager 210 transforms computer system 212 into a special purpose computer system as compared to currently available general computer systems that do not have system manager 210. In the illustrative example, the use of system manager 210 in computer system 212 integrates processes into a practical application for a method for managing a hyperconverged system that increases the performance of the hyperconverged system.

In other words, system manager 210 in computer system 212 is directed to a practical application of processes integrated to monitor hardware resource usage in a hyperconverged system; identify a set of supported applications for the hyperconverged system that have been purchased but are undeployed; determine whether a number of additional hardware nodes is needed to deploy and utilize the set of supported applications for the hyperconverged system that have been purchased but are undeployed; and initiate a set of actions in response to a determination that the number of additional hardware nodes is needed to deploy and utilize the set of supported applications for the hyperconverged system that have been purchased but are undeployed. In this manner, system manager 210 in computer system 212 provides a practical application of a method to manage a hyperconverged system that the functioning of the hyperconverged system is improved.

The illustration of a hyperconverged environment in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment. For example, artificial intelligence system 226 can be a part of system manager 210 instead of as separate components as shown in FIG. 2.

Figure 4:
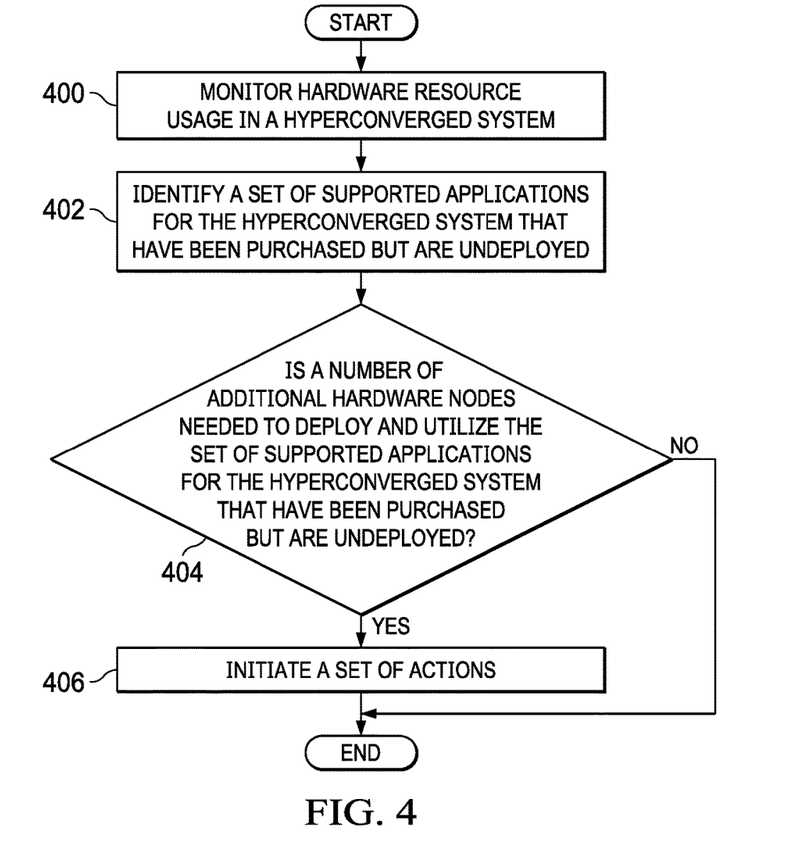
FIG. 4 is a flowchart of a process for managing a hyperconverged system in accordance with an illustrative embodiment.

Turning next to FIG. 4, a flowchart of a process for managing a hyperconverged system is depicted in accordance with an illustrative embodiment. The process in FIG. 4 can be implemented in hardware, software, or both. When implemented in software, the process can take the form of program code that is run by one or more processor units located in one or more hardware devices in one or more computer systems. For example, the process can be implemented in system manager 210 in computer system 212 in FIG. 2.

The process begins by monitoring hardware resource usage in a hyperconverged system (step 400). The process identifies a set of supported applications for the hyperconverged system that have been purchased but are undeployed (step 402). The process determines whether a number of additional hardware nodes is needed to deploy and utilize the set of supported applications for the hyperconverged system that have been purchased but are undeployed (step 404). The determination made in step 404 can be performed using an artificial intelligence system.

When a number of additional hardware nodes is needed, the process initiates a set of actions (step 406). The initiation of the set of actions in step 406 can be performed using an artificial intelligence system. The set of actions can be identified and started using the artificial intelligence system. The process terminates thereafter. With reference again to step 404, if the number of additional hardware nodes is not needed, the process terminates.

Figure 5:
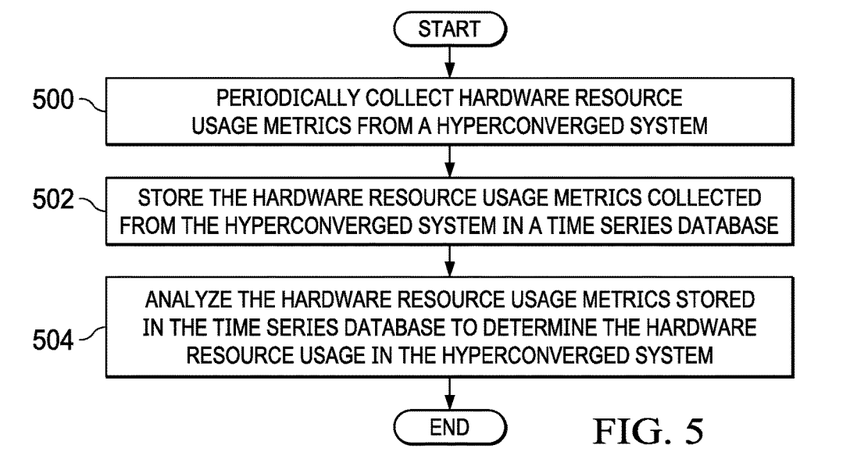
FIG. 5 is a flowchart of a process for monitoring hardware resource usage in accordance with an illustrative embodiment.

Turning next to FIG. 5, a flowchart of a process for monitoring hardware resource usage is depicted in accordance with an illustrative embodiment. The process in FIG. 5 is an example of one implementation for step 400 in FIG. 4.

The process begins by periodically collecting hardware resource usage metrics from a hyperconverged system (step 500). The process stores the hardware resource usage metrics collected from the hyperconverged system in a time series database (step 502). The process analyzes the hardware resource usage metrics stored in the time series database to determine the hardware resource usage in the hyperconverged system (step 504). The process terminates thereafter.

Figure 6:
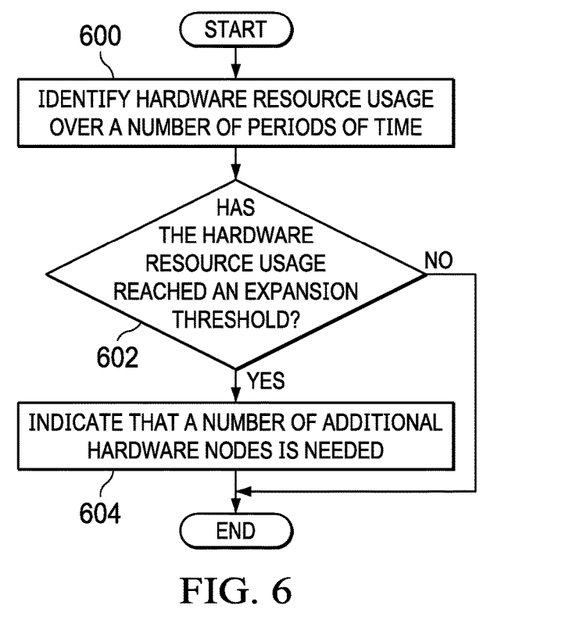
FIG. 6 is a flowchart of a process for determining whether a number of additional hardware nodes is needed in a hyperconverged system in accordance with an illustrative embodiment.

With reference to FIG. 6, a flowchart of a process for determining whether a number of additional hardware nodes is needed in a hyperconverged system is depicted in accordance with an illustrative embodiment. The process in FIG. 6 is an example of one implementation for step 404 in FIG. 4.

The process begins by identifying hardware resource usage over a period of time (step 600). In step 600, the process analyzes hardware resource usage over the period of time of using resource usage data in a time series database, such as resource use data 310 in time series database 312 in FIG. 3. The period of time can be one minute, two hours, three days, one month, or some other suitable period of time. Further, the process can select different periods of time for analysis.

The process determines whether the hardware resource usage has reached an expansion threshold (step 602). The expansion threshold can be a level of resource usage that indicates a reduction in performance in the hyperconverged system, an undesired probability of a failure, a user set resource usage level, or some other suitable value.

If the hardware resource usage has reached an expansion threshold, the process indicates that a number of additional hardware nodes is needed (step 604). The process terminates thereafter. In step 602, if the hardware resource usage has not reached expansion threshold, the process terminates.

Figure 7:
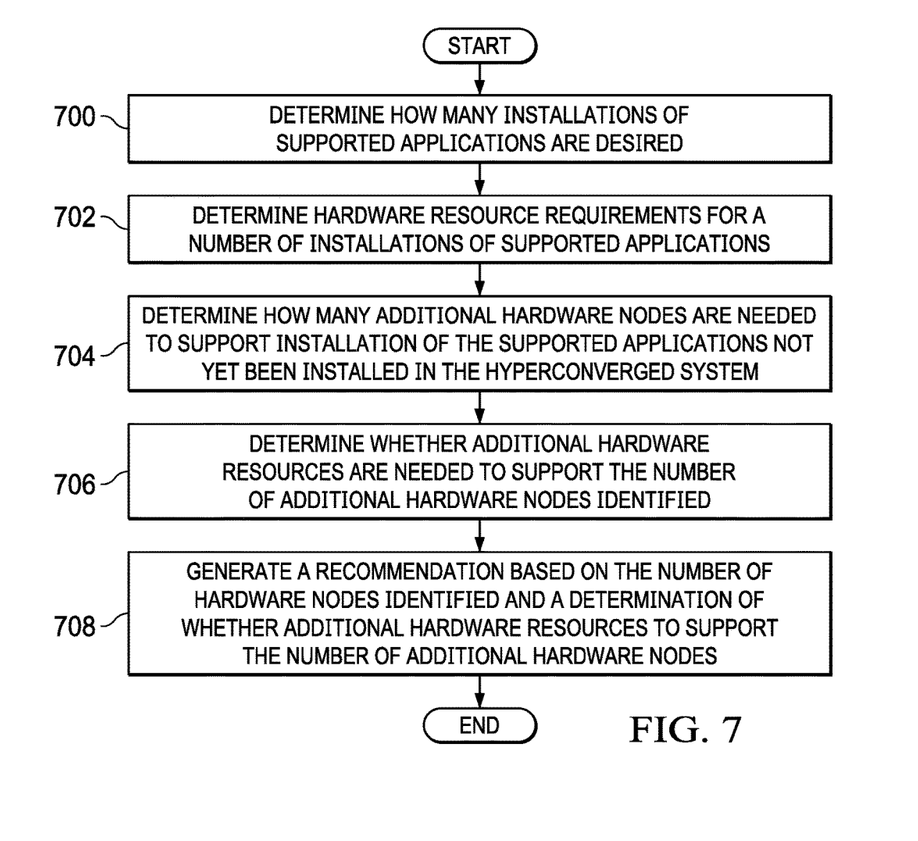
FIG. 7 is a flowchart of a process for generating a recommendation for additional hardware resources in a hyperconverged system in accordance with an illustrative embodiment.

With reference to FIG. 7, a flowchart of a process for generating a recommendation for additional hardware resources in a hyperconverged system is depicted in accordance with an illustrative embodiment. The process in FIG. 7 is an example of one implementation for step 406 in FIG. 4. In this illustrative example, an action in a set of actions is a recommendation for additional hardware resources.

The process begins by determining how many installations of supported applications are desired (step 700). The process determines hardware resource requirements for a number of installations of supported applications (step 702). For example, in step 702, the process can identify minimum hardware resource requirements for supported applications that are to be deployed. Each installation of a supported application uses at least some minimum amount of hardware resources in the hyperconverged system. As another example, the process can identify hardware resource usage attributable to each installation of a supported application that is of the same type of application as the supported applications that are to be installed.

The process determines how many additional hardware nodes are needed to support installation of the supported applications not yet installed in the hyperconverged system (step 704). The process then also determines whether additional hardware resources are needed to support the number of additional hardware nodes identified (step 706). For example, adding additional hardware nodes may require additional switches.

The process generates a recommendation based on the number of hardware nodes identified and the determination of whether additional hardware resources to support the number of additional hardware nodes are needed (step 708). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 8:
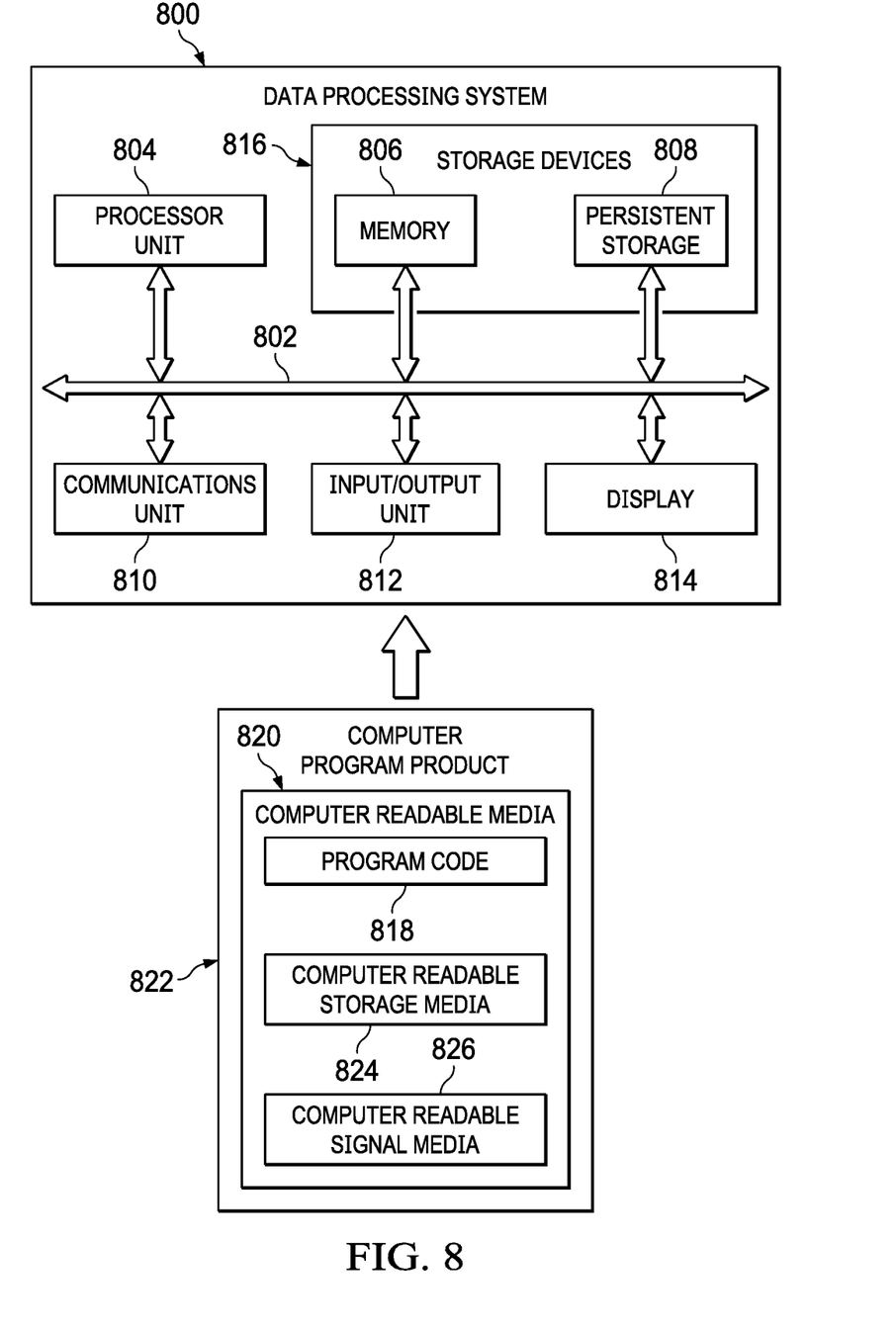
FIG. 8 is a block diagram of a data processing system in accordance with an illustrative embodiment.

Turning now to FIG. 8, a block diagram of a data processing system is depicted in accordance with an illustrative embodiment. Data processing system 800 can be used to implement server computer 104, server computer 106, and hardware nodes 110 in FIG. 1. Data processing system 800 can also be used to implement computer system 212, hardware nodes 208, and additional hardware nodes 222 in FIG. 2. In this illustrative example, data processing system 800 includes communications framework 802, which provides communications between processor unit 804, memory 806, persistent storage 808, communications unit 810, input/output (I/O) unit 812, and display 814. In this example, communications framework 802 takes the form of a bus system.

Processor unit 804 serves to execute instructions for software that can be loaded into memory 806. Processor unit 804 includes one or more processors. For example, processor unit 804 can be selected from at least one of a multicore processor, a central processing unit (CPU), a graphics processing unit (GPU), a physics processing unit (PPU), a digital signal processor (DSP), a network processor, or some other suitable type of processor. For example, further, processor unit 804 can may be implemented using one or more heterogeneous processor systems in which a main processor is present with secondary processors on a single chip. As another illustrative example, processor unit 804 can be a symmetric multi-processor system containing multiple processors of the same type on a single chip.

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer-readable storage devices in these illustrative examples. Memory 806, in these examples, can be, for example, a random-access memory or any other suitable volatile or non-volatile storage device. Persistent storage 808 may take various forms, depending on the particular implementation.

For example, persistent storage 808 may contain one or more components or devices. For example, persistent storage 808 can be a hard drive, a solid-state drive (SSD), a flash memory, a rewritable optical disk, a rewritable magnetic tape, or some combination of the above. The media used by persistent storage 808 also can be removable. For example, a removable hard drive can be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that can be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs can be located in storage devices 816, which are in communication with processor unit 804 through communications framework 802. The processes of the different embodiments can be performed by processor unit 804 using computer-implemented instructions, which may be located in a memory, such as memory 806.

These instructions are referred to as program code, computer usable program code, or computer-readable program code that can be read and executed by a processor in processor unit 804. The program code in the different embodiments can be embodied on different physical or computer-readable storage media, such as memory 806 or persistent storage 808.

Program code 818 is located in a functional form on computer-readable media 820 that is selectively removable and can be loaded onto or transferred to data processing system 800 for execution by processor unit 804. Program code 818 and computer-readable media 820 form computer program product 822 in these illustrative examples. In the illustrative example, computer-readable media 820 is computer-readable storage media 824.

In these illustrative examples, computer-readable storage media 824 is a physical or tangible storage device used to store program code 818 rather than a medium that propagates or transmits program code 818.

Alternatively, program code 818 can be transferred to data processing system 800 using a computer-readable signal media. The computer-readable signal media can be, for example, a propagated data signal containing program code 818. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 800 are not meant to provide architectural limitations to the manner in which different embodiments can be implemented. In some illustrative examples, one or more of the components may be incorporated in or otherwise form a portion of, another component. For example, memory 806, or portions thereof, may be incorporated in processor unit 804 in some illustrative examples. The different illustrative embodiments can be implemented in a data processing system including components in addition to or in place of those illustrated for data processing system 800. Other components shown in FIG. 8 can be varied from the illustrative examples shown. The different embodiments can be implemented using any hardware device or system capable of running program code 818.

Thus, illustrative embodiments of the present invention provide a computer implemented method, computer system, and computer program product for managing a hyperconverged system. A computer system monitors hardware resource usage in a hyperconverged system. The computer system identifies a set of supported applications for the hyperconverged system that have been purchased but are undeployed. The computer system also determines whether a number of additional hardware nodes is needed to deploy and utilize the set of supported applications for the hyperconverged system that have been purchased but are undeployed; and initiates a set of actions in response to a determination that the number of additional hardware nodes is needed to deploy and utilize the set of supported applications for the hyperconverged system that have been purchased but are undeployed.

Thus, the system manager in the illustrative examples can streamline the process of determining when to add hardware to expand a hyperconverged system to support adding new applications to the hyperconverged system. Further, the recommendations can be made ahead of time before the hyperconverged system runs out of hardware resources. The recommendations provided by the system manager can be used to plan additions of hardware before system failures occur or undesired performance occurs in the hyperconverged system.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for managing a hyperconverged system, the method comprising:
monitoring, by a computer system, hardware resource usage in the hyperconverged system;
identifying, by the computer system, a set of supported applications for the hyperconverged system that have been purchased but are undeployed;
determining, by the computer system, whether a number of additional hardware nodes is needed to deploy and utilize the set of supported applications for the hyperconverged system that have been purchased but are undeployed; and
initiating, by the computer system, a set of actions in response to a determination that the number of additional hardware nodes is needed to deploy and utilize the set of supported applications for the hyperconverged system that have been purchased but are undeployed,
wherein the hyperconverged system comprises a virtualization of a plurality of computing resources, storage resources, and network resources on a plurality of hardware nodes in the hyperconverged system, and wherein monitoring, by the computer system, the hardware resource usage in the hyperconverged system comprises:
periodically collecting, by the computer system via a network coupling the hyperconverged system with the computer system, hardware resource usage metrics from the plurality of hardware nodes in the hyperconverged system;
storing, by the computer system, the hardware resource usage metrics collected from the hyperconverged system in a time series database; and
analyzing, by the computer system, the hardware resource usage metrics stored in the time series database to determine the hardware resource usage in the hyperconverged system,
wherein determining, by the computer system, whether the number of additional hardware nodes is needed to deploy and utilize the set of supported applications for the hyperconverged system that have been purchased but are undeployed comprises:
analyzing the hardware resource usage in the hyperconverged system using (1) the hardware resource metrics stored in the time series database and (2) actions performed in response to prior notifications sent recommending adding hardware nodes to the hyperconverged system.

2. The method of claim 1, wherein identifying, by the computer system, the set of supported applications for the hyperconverged system that have been purchased but are undeployed comprises:
identifying, by the computer system, a plurality of supported applications for the hyperconverged system that have been purchased but are undeployed from a plurality of purchase orders for the plurality of supported applications.

3. The method of claim 1, wherein determining, by the computer system, whether the number of additional hardware nodes is needed to deploy and utilize the set of supported applications for the hyperconverged system that have been purchased but are undeployed further comprises:
determining, by an artificial intelligence system in the computer system, whether the number of additional hardware nodes is needed to deploy and utilize the set of supported applications for the hyperconverged system that have been purchased but are undeployed; and
responsive to determining that the number of additional hardware nodes is needed, providing a predicted recommendation regarding the number of additional hardware nodes before the number of additional hardware nodes are needed based on the hardware resource usage metrics stored in the time series database.

4. The method of claim 3, wherein the hardware resource usage comprises at least one a storage usage, a processor usage, a memory usage, and disk input/output, and further comprising:

readjusting the predicted recommendation based on at least one event maintained in an event database, wherein the at least one event indicates an action taken by a user in response to the predicted recommendation.

5. The method of claim 1, wherein the set of actions is selected from at least one of send a recommendation to add the number of additional hardware nodes, generate a purchase order for the number of additional hardware nodes, deploy a set of undeployed hardware nodes; or reallocate a set of deployed hardware nodes.

6. A hardware management system comprising:

a computer system comprising a processor operatively coupled to a memory having computer usable program code stored therein that is operable, when executed by the processor, to perform steps of:

monitor hardware resource usage in a hyperconverged system;

identify a set of supported applications for the hyperconverged system that have been purchased but are undeployed;

determine whether a number of additional hardware nodes is needed to deploy and utilize the set of supported applications for the hyperconverged system that have been purchased but are undeployed; and initiate a set of actions in response to a determination that the number of additional hardware nodes is needed to deploy and utilize the set of supported applications for the hyperconverged system that have been purchased but are undeployed, wherein the hyperconverged system comprises a virtualization of a plurality of computing resources, storage resources, and network resources on a plurality of hardware nodes in the hyperconverged system, and wherein in monitoring the hardware resource usage in the hyperconverged system, the computer system is configured to:

periodically collect, by the hardware management system, hardware resource usage metrics from the plurality of hardware nodes in the hyperconverged system via a network coupling the hyperconverged system with the hardware management system;

store, by the hardware management system, the hardware resource usage metrics collected from the hyperconverged system in a time series database; and analyze, by the hardware management system, the hardware resource usage metrics stored in the time series database to determine the hardware resource usage in the hyperconverged system, wherein in determining whether the number of additional hardware nodes is needed to deploy and utilize the set of supported applications for the hyperconverged system that have been purchased but are undeployed, the computer system is configured to:

analyze the hardware resource usage in the hyperconverged system using (1) the hardware resource metrics stored in the time series database and (2) actions performed in response to prior notifications sent recommending adding hardware nodes to the hyperconverged system.

7. The hardware management system of claim 6, wherein in identifying the set of supported applications for the hyperconverged system that have been purchased but are undeployed, the computer system is configured to:

identify a plurality of supported applications for the hyperconverged system that have been purchased but are undeployed from a plurality of purchase orders for the plurality of supported applications.

8. The hardware management system of claim 6, wherein in determining whether the number of additional hardware nodes is needed to deploy and utilize the set of supported applications for the hyperconverged system that have been purchased but are undeployed, the computer system is further configured to:

determine whether the number of additional hardware nodes is needed to deploy and utilize the set of supported applications for the hyperconverged system that have been purchased but are undeployed using an artificial intelligence system in the computer system; and provide a predicted recommendation regarding the number of additional hardware nodes before the number of additional hardware nodes are needed based on the hardware resource usage metrics stored in the time series database responsive to determining that the number of additional hardware nodes is needed.

9. The hardware management system of claim 8, wherein the hardware resource usage comprises at least one a storage usage, a processor usage, a memory usage, and disk input/output, and wherein the computer system is further configured to:

readjust the predicted recommendation based on at least one event maintained in an event database, wherein the at least one event indicates an action taken by a user in response to the predicted recommendation.

10. The hardware management system of claim 6, wherein the set of actions is selected from at least one of send a recommendation to add the number of additional hardware nodes, generate a purchase order for the number of additional hardware nodes, deploy a set of undeployed hardware nodes, or reallocate a set of deployed hardware nodes.

11. A computer program product for managing a hyperconverged system, the computer program product comprising:

a computer-readable storage media;

first program code, stored on the computer-readable storage media, for monitoring hardware resource usage in the hyperconverged system;

second program code, stored on the computer-readable storage media, for identifying a set of supported applications for the hyperconverged system that have been purchased but are undeployed;

third program code, stored on the computer-readable storage media, for determining whether a number of additional hardware nodes is needed to deploy and utilize the set of supported applications for the hyperconverged system that have been purchased but are undeployed; and fourth program code, stored on the computer-readable storage media, for initiating a set of actions in response to a determination that the number of additional hardware nodes is needed to deploy and utilize the set of supported applications for the hyperconverged system that have been purchased but are undeployed, wherein the computer program product is operable to execute on a separate hardware management system, and wherein the hyperconverged system comprises a virtualization of a plurality of computing resources, storage resources, and network resources on a plurality of hardware nodes in the hyperconverged system, and wherein the first program code comprises:

program code, stored on the computer-readable storage media, for periodically collecting hardware resource usage metrics from the plurality of hardware nodes in the hyperconverged system via a network coupling the hyperconverged system with the hardware management system;

program code, stored on the computer-readable storage media, for storing the hardware resource usage metrics collected from the hyperconverged system in a time series database; and     program code, stored on the computer-readable storage media, for analyzing the hardware resource usage metrics stored in the time series database to determine the hardware resource usage in the hyperconverged system, wherein the third program code comprises:

program code, stored on the computer-readable storage media, for analyzing the hardware resource usage in the hyperconverged system using (1) the hardware resource metrics stored in the time series database and (2) actions performed in response to prior notifications sent recommending adding hardware nodes to the hyperconverged system.

12. The computer program product of claim 11, wherein the second program code comprises:

program code, stored on the computer-readable storage media, for identifying a plurality of supported applications for the hyperconverged system that have been purchased but are undeployed from a plurality of purchase orders for the plurality of supported applications.

13. The computer program product of claim 11, wherein the third program code further comprises:

program code, stored on the computer-readable storage media, for determining whether the number of additional hardware nodes is needed to deploy and utilize the set of supported applications for the hyperconverged system that have been purchased but are undeployed;

program code, stored on the computer-readable storage media, for providing a predicted recommendation regarding the number of additional hardware nodes before the number of additional hardware nodes are needed based on the hardware resource usage metrics stored in the time series database responsive to determining that the number of additional hardware nodes is needed; and     program code, stored on the computer-readable storage media, for readjusting the predicted recommendation based on at least one event maintained in an event database, wherein the at least one event indicates an action taken by a user in response to the predicted recommendation.

14. The computer program product of claim 11, wherein the set of actions is selected from at least one of send a recommendation to add the number of additional hardware nodes, generate a purchase order for the number of additional hardware nodes, deploy a set of undeployed hardware nodes; or reallocate a set of deployed hardware nodes.

* * * * *